UNITED STATES PATENT OFFICE 2,435,506

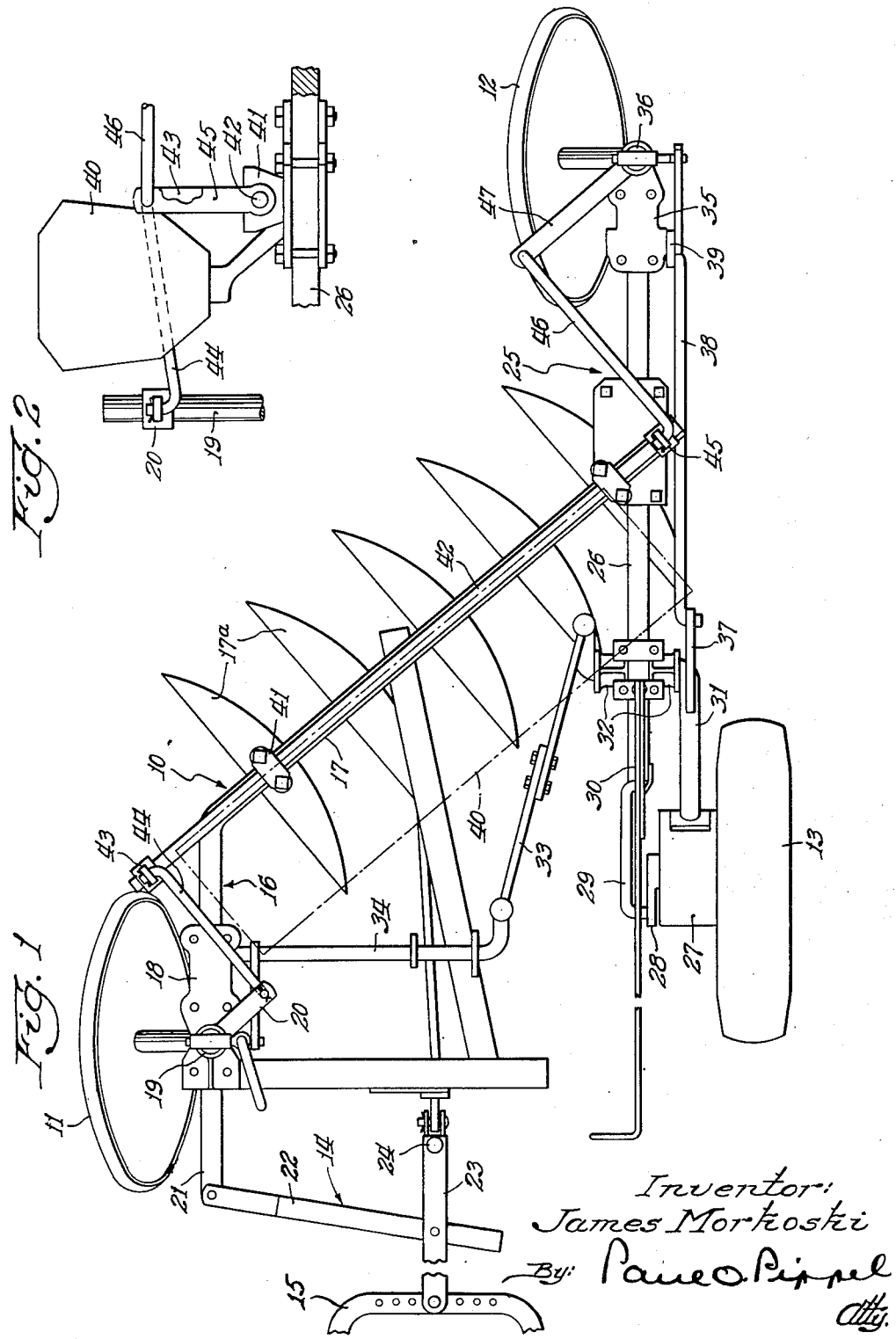

STEERING MEANS FOR AGRICULTURAL IMPLEMENTS

James Morkoski, Canton, Ill., assignor to International Harvester Company, a corporation of New Jersey Application November 14, 1945, Serial No. 628,591

6 Claims. (Cl. 97—181)

This invention relates to agricultural implements and particularly to plows of the harrow type wherein a gang of disks or the like is arranged diagonally of the path of travel and is supported upon wheels which include furrow wheels at opposite ends of the gang.

A land wheel provides lifting power for a harrow plow such as that incorporating the features of the present invention, and the implement is drawn by a tractor or other source of draft power. The furrow wheels are steered to cause the plow to follow in the path of the tractor, movement of the tractor being transmitted to the front furrow wheel and from there to the rear wheel. Since in implements of this type the rear furrow wheel is spaced both longitudinally and laterally from the front furrow wheel and the tool-carrying portion of the frame is diagonal to the direction of travel, the steering mechanism has presented problems difficult of satisfactory solution. Where the plow alone has been used, an arm on the front furrow wheel spindle has often been connected directly by a thrust rod with an arm on the rear furrow wheel spindle, the rod generally paralleling the tool gang at a location thereabove. The rod is placed well above the tool gang to avoid interference with other working parts and to accommodate the up and down and longitudinal movement of the rod with the vertical and rotary movement of the furrow wheel spindles to raise and steer the implement. An important objection to this position of the rod has been that it interfered with the use of a seed box or the like in conjunction with the plowing operation. It was therefore necessary to supply a different steering device designed to avoid the grain box and sometimes a complicated motion-transmitting mechanism was required.

An object of the present invention is to simplify the steering problem and to provide a steering mechanism which is usable without change where the plow is used alone and where it is used with a seed box or the like.

Another object is to provide a steering transmission mechanism designed to avoid interference with the grain box and comprising a rockshaft mounted in bearings closely adjacent the tool-carrying beam of the plow and which does not move vertically with the up and down movement of the wheel spindles or longitudinally with the rotation thereof.

Another object is to provide an axially rockable steering rod closely associated with the tool-carrying beam and provided with rock arms operatively connected to the steering arms of the furrow wheel spindles.

The preesnt invention is illustrated as incorporated in a disk harrow of generally conventional form and construction adapted for attachment to a tractor or the like to be drawn therebehind. It may be understood that while the present invention is shown in its application to a disk harrow, it will likewise find utility in other implements wherein similar problems are involved.

Other objects and advantages of the invention will become clear from the following detailed description when read in conjunction with the accompanying drawings, wherein:

Figure 1 is a plan view of a harrow plow connected to a tractor and embodying the features of the present invention.

Figure 2 is an end elevation partly in section showing the arrangement of the elements embodying the present invention.

Referring to the drawings, it will be noted briefly that the harrow plow of the present invention includes a frame generally indicated by the numeral 10, supported upon front and rear furrow wheels 11 and 12 and a land wheel 13. A hitch structure 14 is provided and shown as attached to the draw-bar 15 of a tractor.

The frame of the plow includes a generally longitudinally extending tool beam 16 having a diagonally extending tool-carrying portion 17 carrying a gang of disks 17ª. Upon the forward end of the beam 16 is mounted a casting 18 which supports a vertically extending spindle 19 carrying the front furrow wheel 11 and to the upper end of which is secured a steering arm 20 by which the spindle 19 may be rocked about its axis. Another arm 21 is secured to the lower portion of the spindle 19 and projects forwardly for pivotal connection to a steering bar 22 which in turn is connected to a draft bar 23 pivotally attached to the draw-bar 15 of the tractor. Draft bar 23 is laterally pivoted upon the plow frame at 24 so that turning of the tractor causes the draft bar to swing laterally and rock the arm 21 to steer the front furrow wheel 11.

To the rear end of the diagonal portion 17 of the beam 16 is secured a wheeled truck 25 including a beam 26 having mounted upon one end thereof the land wheel 13 and upon the other end the rear furrow wheel 12. Lifting power for raising and lowering the plow frame is supplied by the movement of the land wheel 13 which has mounted thereupon a conventional half-revolution clutch 27. Clutch 27 includes a crank 28 which upon operation of the clutch 27 acts through a link 29 connected at one end to the crank and at the other end to a lever and quadrant arrangement 30 mounted upon the beam 26. Land wheel 13 is mounted upon a crank axle 31 which is pivotally mounted for swinging movement in bearings 32 secured to the beam 26. Thus actuation of the clutch 27 and the crank 28, acting through link 29, swings the axle 31 carrying the land wheel 13 in a generally vertical direction to raise and lower the frame.

The end of crank axle 31 projecting inwardly from the beam 26 is operatively connected by a link 33 to a rockshaft 34 mounted upon the frame which in turn is connected to the upper end of the spindle 19 for the purpose of effecting vertical movement of the spindle 19 with respect to the frame to raise the front end thereof.

The rear end of beam 26 is provided with a casting 35, in which is mounted for vertical sliding movement with respect thereto a spindle 36 similar to spindle 19 and carrying at the lower end thereof the rear furrow wheel 12. Spindle 36 is raised and lowered in a manner similar to spindle 19 and is operatively connected for that purpose to the crank axle 31 by means of an arm 37 secured to the crank axle and connected by a link 38 to a crank 39 mounted on the casting 35 which is in turn connected to the upper end of the spindle 36.

From the drawing it will be noted that the wheels 11 and 12 are at opposite ends of and at opposite sides of the diagonal tool-carrying beam portion 17.

It will likewise be noted that a seed box 40 mounted upon the diagonal portion 17 extends between the wheels 11 and 12. Steering motion is transmitted from the front furrow wheel 11 to rear furrow wheel 12 by a mechanism now to be described. Secured to the diagonal beam portion 17 are spaced bearing blocks 41 having mounted therein for rocking movement a shaft 42 parallel to the beam portion 17 and closely adjacent thereto below the seed box 40. The forward end of the rock-shaft 42 has secured thereto an upwardly extending rock arm 43 connected at its upper end by a link 44 to the steering arm 20 on the upper end of spindle 19. The rear end of shaft 42 has secured thereto an upwardly extending arm 45 similar to arm 43 and pivotally connected by a link 46 with a steering arm 47 affixed to the upper end of the rear furrow wheel spindle 36.

Motion of the tractor by which the implement of the present invention is drawn is transmitted through draft bar 23, bar 22, and arm 21 to the front wheel 11 from which steering motion is transmitted by way of steering arm 20 and rock-shaft 42 to the rear furrow wheel 12.

It will thus be observed that a simple and efficient mechanism has been devised by which steering motion may be transmitted from the front furrow wheel of a harrow plow or the like to the rear furrow wheel thereof without in any way interfering with the other operating parts of the plow structure. Whereas previous steering motion transmission mechanisms were somewhat ungainly and extended upwardly above the grain box to make direct connection between the front and rear furrow wheels involving the likelihood of contact with the grain box, the rock-shaft of the present invention is below the grain box, does not move up and down with the wheels or longitudinally with the steering thereof and does not interfere in any way with other working parts of the plow.

Having now described the invention, it should be understood that modifications may be made therein without departing from the spirit thereof. It is therefore desired that the invention be limited only by the scope of the appended claims.

What is claimed is:

1. An agricultural implement comprising a generally longitudinally extending supporting frame, earth-working tools carried by and depending from the frame, vertically extending wheel spindles carried at each end of the frame for vertical adjustment relative thereto and having their upper ends extending above the frame, radially projecting arms at the upper ends of said spindles, ground-supporting wheels mounted on the lower ends of the spindles, laterally swingable hitch means at one end of the frame, a connection between the hitch means and one said wheel for steering the same, and means steerably connecting said wheels including a rock-shaft mounted on said frame parallel and closely adjacent thereto, an upwardly projecting arm on each end of the shaft, and linkage connecting said last-mentioned arms to the arms on said spindles.

2. An agricultural implement comprising a generally longitudinally extending supporting frame, earth-working tools carried by and depending from the frame, vertically extending wheel spindles carried at each end of the frame for vertical adjustment relative thereto and having their upper ends extending above the frame, radially projecting arms at the upper ends of said spindles, ground-supporting wheels mounted on the lower ends of the spindles, laterally swingable hitch means at one end of the frame, a connection between the hitch means and one said wheel for steering the same, means steerably connecting said wheels including a rock-shaft mounted on said frame parallel and closely adjacent thereto, an upwardly projecting arm on each end of the shaft, linkage connecting said last-mentioned arms to the arms on said spindles, and a generally longitudinally extending container for grain or the like mounted on the frame parallel thereto between said spindles and above said rock-shaft.

3. An agricultural implement comprising a generally longitudinally extending supporting frame, earth-working tools carried by and depending from the frame, vertically extending wheel spindles carried at each end of the frame for vertical adjustment relative thereto and having their upper ends extending above the frame, radially projecting arms at the upper ends of said spindles, ground-supporting wheels mounted on the lower ends of the spindles, laterally swingable hitch means at one end of the frame, a connection between the hitch means and one said wheel for steering the same, means steerably connecting said wheels including bearings secured closely adjacent said frame and at longitudinally spaced points thereon, a rock-shaft mounted in said bearings and extending to opposite ends of the frame, an upwardly projecting arm on each end of the shaft, and a link connecting the arm on each spindle to the rock-shaft arm nearest thereto.

4. An agricultural implement comprising a generally longitudinally extending frame having a tool-carrying portion, a wheel axle mounted on the frame at each end thereof for vertical adjustment relative thereto and having an upright spindle portion extending above the frame, a radially projecting arm at the upper end of each said spindle portion, a ground-supporting wheel carried by each said axle, and means steerably connecting said wheels including a rock-shaft mounted on the frame parallel to said tool-carrying portion, an upwardly extending arm at each end of said shaft, linkage connecting the last-mentioned arms to the arms on said spindles, and a longitudinally extending container for grain or the like mounted on the frame between said spindles and above said rock-shaft.

5. In an agricultural implement, a generally longitudinally extending frame having a diagonal tool-carrying portion, a wheel axle mounted on the frame at each end thereof for vertical adjustment relative thereto and having an upright spindle portion extending above the frame, a longitudinally extending container for grain or the like parallel to and mounted upon the said diagonal tool-carrying portion between said wheel axles, a radially projecting arm on each said spindle portion, means operatively connecting said arms comprising a rock-shaft mounted in bearings on the diagonal portion of the frame below said container, an upright rock arm adjacent each end of said shaft, and means connecting the rock arms on said shaft to the arms on said wheel axles, whereby to transmit steering motion from one said wheel to the other.

6. In a disk plow having a diagonal tool-carrying frame section, a steerable ground-engaging wheel adjacent each end of the diagonal frame section and at opposite sides thereof, a dispensing container mounted upon said frame section and extending parallel thereto between said wheels, and means for transmitting steering motion from one said wheel to the other comprising a rock-shaft mounted in bearings on said diagonal frame section parallel to said frame section, a rock arm adjacent each end of said shaft, and means operatively connecting said rock arms and said wheels.

JAMES MORKOSKI.

REFERENCES CITED

The following references are of record in the file of this patent:

UNITED STATES PATENTS

| Number | Name | Date |
|---|---|---|
| 777,935 | Boenker | Dec. 20, 1904 |
| 1,015,544 | Cox | Jan. 23, 1912 |
| 1,226,793 | Morgan | May 22, 1917 |
| 1,702,615 | Paul | Feb. 19, 1929 |
| 2,378,635 | Hyland | June 19, 1945 |

FOREIGN PATENTS

| Number | Country | Date |
|---|---|---|
| 835,368 | France | Sept. 19, 1938 |